United States Patent
Matsumoto et al.

(10) Patent No.: US 6,382,949 B1
(45) Date of Patent: *May 7, 2002

(54) METAL MOLD FOR PRODUCING A SYNTHETIC RESIN MOLDED PRODUCT IN A COMPRESSION-MOLDING METHOD

(75) Inventors: Masahito Matsumoto, Ibaraki; Nobuhiro Usui, Takatsuki; Yoshitaka Kobayashi, Ibaraki, all of (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,152
(22) Filed: Jan. 19, 1999

(30) Foreign Application Priority Data

Jan. 19, 1998 (JP) .......................................... 10-007385

(51) Int. Cl.⁷ ............................................. B29C 43/02
(52) U.S. Cl. ................... 425/192 R; 425/193; 425/414; 425/416; 264/255
(58) Field of Search ................................. 425/195, 193, 425/416, 419, 192 R, 414, 112; 264/328.7, 255; 249/102, 155

(56) References Cited

U.S. PATENT DOCUMENTS

| 3,809,733 A | * | 5/1974 | Sandiford et al. | 264/45 |
| 4,707,321 A |   | 11/1987 | Segawa et al. | 264/294 |
| 4,932,857 A | * | 6/1990 | Nishino et al. | 425/394 |
| 5,094,602 A | * | 3/1992 | Morita | 425/130 |
| 5,223,201 A | * | 6/1993 | Masui et al. | 264/163 |
| 5,238,640 A | * | 8/1993 | Masui et al. | 264/266 |
| 5,288,222 A | * | 2/1994 | Wieser | 425/190 |
| 5,593,631 A |   | 1/1997 | Hara et al. | 264/257 |
| 5,741,446 A | * | 4/1998 | Tahara et al. | 264/1.9 |

FOREIGN PATENT DOCUMENTS

| DE | 33 15 746 A1 | 11/1983 |
| EP | 0 333 198 A2 | 9/1989 |
| EP | 0 405 588 A2 | 1/1991 |
| EP | 0 405 589 | 1/1991 |
| WO | WO 99/44801 | 9/1999 |

OTHER PUBLICATIONS

Patents Abstract of Japan of JP–06–344365, vol. No. 3, Apr. 28, 1995.

* cited by examiner

Primary Examiner—Nam Nguyen
Assistant Examiner—Joseph S Del Sole
(74) Attorney, Agent, or Firm—Fitch Even, Tabin & Flannery

(57) ABSTRACT

The present invention relates to a metal mold for producing a synthetic resin molded product in a compression-molding method, which is comprises a pair of male and female molds which are allowed to mutually slide over a contact face, with the outer circumferential face of the male mold and the inner circumferential face of the female mold serving as sliding portions at the time of mold-clamping, characterized in that either the male mold or the female mold or both of the molds is constituted by a mold main body and a sliding member. The sliding member forms a portion of the metal mold over the entire sliding portions or on a portion thereof, and is removably attached to the mold main body. The same metal mold may be used for production of a non-laminated synthetic resin molded product and a laminated product having the same design by replacing only the sliding member, without the need for using different molding devices corresponding to the respective production processes.

7 Claims, 2 Drawing Sheets

METAL MOLD FOR PRODUCING A SYNTHETIC RESIN MOLDED PRODUCT IN A COMPRESSION-MOLDING METHOD

BACKGROUND OF THE INVENTION

1. Field of the Invention

The present invention relates to a metal mold for producing a synthetic resin molded product in a compression-molding method.

2. Description of the Prior Art

Thermoplastic resin molded products have been used in a wide range including interior parts for cars (for example, door trims and instrument panels), interior and exterior parts for home-use electric appliances, etc., and the injection-molding method and the compression-molding method are known as producing methods for such thermoplastic resin molded products.

Moreover, these molded products are formed as thermoplastic resin molded products without a covering material on their surface or covering-material affixed thermoplastic resin laminated products with a covering material on their surface depending on their purposes and applications.

Conventionally, with respect to a molding method for the thermoplastic resin molded product without a covering material on its surface, the compression-molding, method is widely used, in which melted thermoplastic resin is supplied into the cavity of a metal mold consisting of male and female molds and molding is carried out by clamping the male and female molds. With respect to the compression-molding method for the covering-material affixed thermoplastic resin laminated product with a covering material on its surface, a method which preliminarily provides a covering material between the male and female molds before the melted thermoplastic resin supplying process in the above-mentioned molding method is widely used. (Japanese Laid-Open Patent Publication No. 235613/1989 (Tokukai-hei 1-235613).

With respect to metal molds used for the above-mentioned methods, in the case of the thermoplastic resin molded product without a covering material on its surface, it is proposed that the gap of the sliding portion of the male and female molds at the time of mold-clamping be set in the range of 0.02 mm to 0.1 mm [see Japanese Laid-Open Patent Publication No. 34819/1991 (Tokukai-hei 3-34819)], and in the case of the covering-material affixed thermoplastic resin laminated product with a covering material on its surface, it is also proposed that the above-mentioned gap be set in the range of 0.25 to 3 times the restorable thickness of the covering material [see Japanese Laid-Open Patent Publication No. 34830/1991 (Tokukai-hei 3-34830)].

Here, the restorable thickness of the covering material refers to a thickness of a covering material upon application of a maximum compression, which is defined as follows: after a pressure has been applied onto only a covering material, the covering material is allowed to restore its original thickness before the application of the pressure; thus, this value differs depending on the kinds, thickness, etc. of the covering material.

However, the problem with these methods is that since the gap of the sliding portion of the male and female molds is different between metal molds for producing the thermoplastic resin molded product without a covering material and metal molds for producing the covering-material affixed thermoplastic resin molded product with a covering material, discrete metal molds have to be used for the respective product modes even when those thermoplastic resin molded products based upon the same design are produced.

BRIEF SUMMARY OF THE INVENTION

Under such circumstances, the inventors of the present invention have made efforts to develop a metal mold which eliminates the necessity of using respectively discrete molding devices corresponding to the respective manufacturing processes in the case when a synthetic resin molded product without a covering material on its surface and a covering-material affixed synthetic resin laminated product with a covering material on its surface have the same design, and which makes it possible to easily produce the two types of products using basically the same metal mold; thus, the present invention has been devised.

In other words, the present invention provides (1) a metal mold for producing a synthetic resin molded product in a compression molding method, which is constituted by a pair of male and female molds that are allowed to mutually slide over the entire contact face, with the outer circumferential face of the male mold and the inner circumferential face of the female mold serving as sliding portions at the time of mold-clamping, characterized in that either the male mold or the female mold or both of the molds is constituted by a mold main body and a sliding member that constitutes a portion of the mold over the entire sliding portions or on a portion thereof, and in that the sliding member is freely removably attached to the mold main body, (2) the metal mold according to item no. 1, wherein the sliding clearance of the male and female molds at the time of mold-clamping is changed by a replacement of two or more of said sliding members having different sliding clearances between the outer circumferential face of the male mold or the inner circumferential face of the female mold, (3) the metal mold according to item no. 1 or 2, wherein the synthetic resin is thermoplastic resin, (4) a molding device which is characterized by comprising the metal mold as defined in item 1, 2 or 3, (5) a method for producing a synthetic resin molded product, which comprises the step of clamping the metal mold as defined in item 1, 2 or 3, (6) use of the metal mold as defined in item 1, 2 or 3 for producing a synthetic resin molded product.

DETAILED DESCRIPTION OF THE PREFERRED EMBODIMENT

Referring Figures, the following description will discuss embodiments of the present invention.

This embodiment is one example of the present invention, and the present invention is, of course, not intended to be limited thereby.

Figure 1:
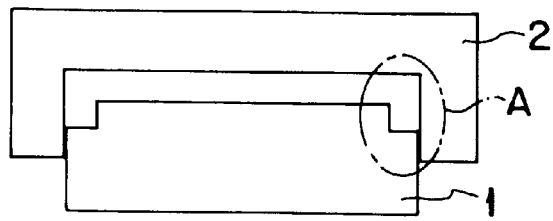
FIG. 1 is a schematic cross-sectional view of a conventional mold.

FIG. 1 is a schematic cross-sectional view that shows a commonly-used metal mold consisting of a pair of female (1) and male (2) molds; and portion A indicates a sliding portion that is allowed to slide upon clamping the two molds.

Figure 2:
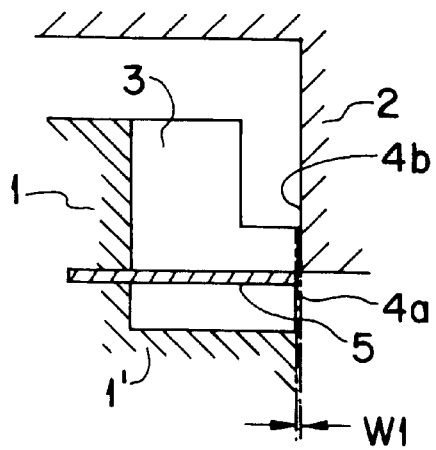
FIG. 2 is a partial cross-sectional view of a metal mold of the present invention.

FIG. 2 is a partial cross-sectional view of a metal mold of the present invention that corresponds to the sliding portion of the metal mold shown in FIG. 1; and it is constituted by a male mold (1), a mold main body (1') and a sliding member (3). The sliding portion (3), which is designed to form one portion of the metal mold over the entire contact face of the sliding portion of the male mold or on a portion thereof, is removably attached to the mold main body, and as illustrated in the Figure, the sliding member (3) and the mold main body (1') in their combined state form the same shape as the male mold shown in FIG. 1, and have functions as the male mold (1).

Figure 4A:
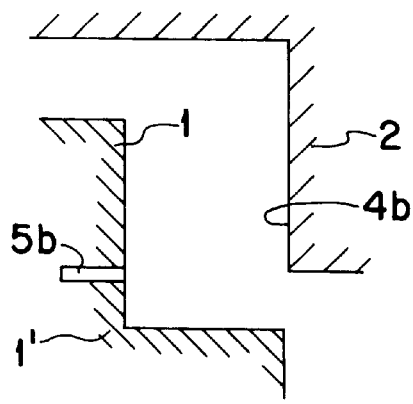
FIGS. 4A–B shows schematic cross-sectional views of the metal hold shown in FIG. 2 with the metal mold having the sliding member removed therefrom (FIG. 4A) and the sliding member that has been removed (FIG. 4B).
Figure 4B:
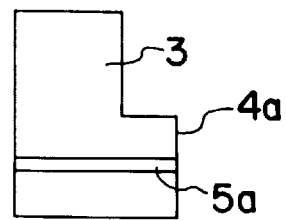

FIG. 4a shows a state in which the sliding, member (3) has been removed from the combined state with the mold main body (1') in FIG. 2, and the FIG. 4b shows the sliding, member (3) that has been removed.

In FIG. 2, the sliding face (4a) of the sliding member (3) is designed so that, when combined with the mold main body (1'), the sliding member is made identical to the outer circumferential face of the mold main body (1'), and in this case, the distance (sliding clearance) between the sliding face (4a) of the sliding member (3) and the sliding face (inner circumferential face)(4b) of the female mold (2) is set at W1.

Figure 3:
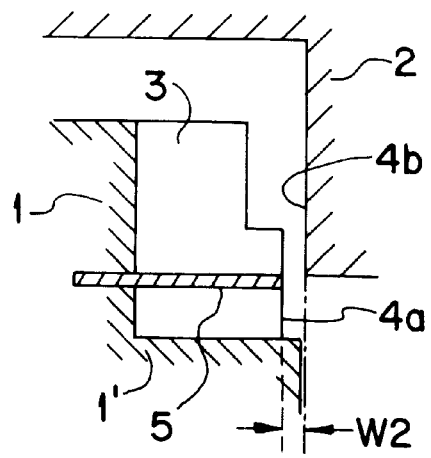
FIG. 3 is a partial cross-sectional view of the metal mold shown in FIG. 2 of the present invention, in which the sliding clearance has been changed.

FIG. 3 shows the same structure as the sliding member shown in FIG. 2 except that, when the sliding member (3) is combined with the same mold main body (1') as shown in FIG. 2, the sliding face (4a) of the sliding member is maintained inside the outer circumferential face of the mold main body (1'), and at this time, the distance (sliding clearance) between the sliding face (4a) of the sliding member (3) and the sliding face (inner circumferential face) (4b) of the female mold (2) is set at W2.

Therefore, a plurality of sliding members in which W2 is varied based upon the sliding clearance W1 are prepared, and these sliding members are appropriately replaced so as to be combined with the mold main body; thus, without entirely replacing a male mold or a female mold or both of the molds, as a whole, the gap (sliding clearance) of the sliding portions between the male and female molds can be desirably adjusted. Therefore, the respective constructions are applied in the same manner as a plurality of discrete molds.

The thickness (distance from the sliding face (4a)) and the height (distance from the mold cavity face) of the sliding member (3) are appropriately determined in the light of the strength defined as an independent member and the size of the metal mold itself, and its shape is not specifically limited, as long as it is a shape that is allowed to function as a male or female mold as a whole.

With respect to the material of the sliding member (3), steel, which is generally used as a material for metal molds, is generally adopted; however the material is not specifically limited, and for example, zinc alloy, aluminum alloy, copper alloy, etc. may be used, and the same material as the mold main body or the material different therefrom may be used.

In the case of a narrow sliding clearance, when the metal mold face slides against the sliding member, the sliding face corresponding to the product designed surface might be worn out, with the result that the product appearance is adversely affected; therefore, for the metal mold or the sliding member on the product designed surface, it is preferable to select a material having a hardness higher than that of the material used for the metal mold or the sliding member on the non-product designed surface so as to prevent the sliding face corresponding to the product designed surface from being worn out upon sliding operations.

The sliding member (3) needs to be removably attached to the mold main body (1') so as to allow for replacement, and it is preferably designed to be firmly integrated into one unit when combined with the mold main body, and also to be easily detached upon replacement. With respect to such attaching and detaching means, for example, a method for using screws, bolts (5), etc. as shown in FIG. 2, and a method for using a precise snap-in system between the sliding member (3) and the mold main body (1') are listed; however, the means is not limited, and an appropriate method is selected.

Upon producing synthetic resin molded resin product by using such a metal mold, in the case of the synthetic resin molded product without a covering material on its surface, the sliding face (4a) of the sliding member is designed so that when the sliding member (3) is combined with the mold main body (1'), it is made identical to the outer circumferential surface of the mold main body (1') as illustrated in Pig. 2, and a mold, in which the sliding member whose sliding clearance at this time is W1 is combined with the mold main body, is used; thus, the sliding clearance W1 at this time is set as a gap that does not allow melted synthetic resin supplied at the time of mold-clamping to leak therefrom and that is suitable for molding without allowing air to remain inside the metal mold. In general, the gap (sliding clearance) is set in the range of 0.02 to 0.1 mm; however, in practice, this is appropriately determined in accordance with various conditions, such as kinds, viscosity, temperature, the amount of supply of a synthetic resin to be used and the shape of the metal mold.

Moreover, in the case of the covering-material affixed synthetic resin laminated product with a covering material on its surface, the sliding member that was previously used is removed from the mold in which the sliding member was combined with the mold main body, and a mold in which a sliding member having the same construction as the previously-used sliding member except that the sliding clearance is set at W2 is combined with the same mold main body, is used as shown in FIG. 3; thus, the sliding clearance W2 at this time is set at a gap that does not allow a melted synthetic resin supplied at the time of mold-clamping to leak therefrom, that allows the covering material to be squeezed into the metal mold without being subjected to an excessive, unnecessary resistance in the clearance section at the time of mold-clamping, and that makes it possible to provide a laminated molded product free from tearing in the covering material, wrinkles, whitening phenomenon, etc. after molding. In general, the sliding clearance is set in the range of 0.25 to 3 times the restorable thickness of the covering material that is commonly used; however, in practice, this is appropriately determined in accordance with various conditions, such as kinds, viscosity, temperature, the amount of supply of a synthetic resin to be used and the shape of the metal mold.

In the metal mold of the present invention, for synthetic resin molded products formed based on the same design with or without a covering-material on their surface, a decision as to whether the sliding member constitutes a portion of the metal mold over the entire sliding portion or on a portion thereof, i.e. the sliding member is placed over the entire outer circumferential portion of the mold main body or on a portion thereof, is made depending on the layout of the covering material; however, in general, the sliding member is placed over the entire circumferential portion of the mold main body when the covering material is affixed over the entire surface (i.e. entire lamination), and it is placed on a portion of the outer circumferential portion of the mold main body corresponding to the layout position of a covering material when the covering material is partially affixed (i.e. partial lamination).

In both cases of the entire lamination or the partial lamination of the covering material, the sliding member may, of course, be partially placed in a dispersed manner so as to place one or a plurality of them, without being placed over the entire outer circumferential portion of the mold main body corresponding to the layout position of the covering material, depending on factors such as the shape of synthetic resin molded products, the property of the covering material and the molding conditions.

Moreover, in the case when the desired sliding clearance varies partially depending on the shape of products, the property of the covering material, etc., a single sliding member, designed so as to have optimal sliding clearances at the respective portions, may be used, or sliding members having different clearances may be appropriately combined.

Figure 5A:
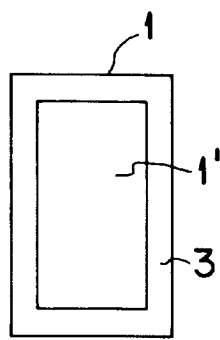
FIGS. 5a–c shows three examples of the layout of the sliding member as plan views seen from the cavity surface of the metal mold.
Figure 5B:
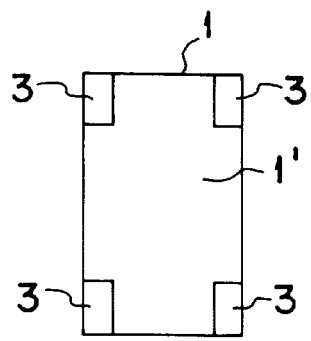
Figure 5C:
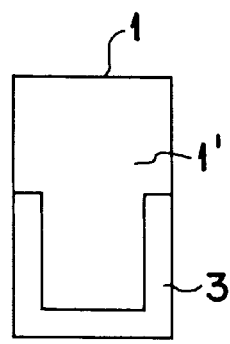

FIG. 5 shows layouts of such sliding members as plan views seen from the cavity surface of a metal mold; (a) is an example in which the sliding member (3) is placed over the entire outer circumferential portion of the mold main body upon lamination of the covering material over the entire surface, (b) is an example in which the sliding member (3) is placed on a portion of the outer circumferential portion of the mold main body upon lamination of the covering material over the entire surface, and (c) is an example in which the sliding members (3) is placed on the outer circumferential portion of the mold main body corresponding to the covering-material position upon partial lamination of the covering material.

In the above-mentioned explanation, the sliding member (3) is placed on the male mold (1); however, the sliding member may be placed on the female mold (2), and may, of course, be placed on both of the male and female molds. Further, the positional relationship of the male and female molds may be reversed, and the installation of them is appropriately determined.

Furthermore, in the metal mold of the present invention, no difference is made by the mold-clamping direction upon molding, and the mold-clamping may be applied either in up and down directions or in right and left directions.

In the case when synthetic resin molded products having the same design with or without a covering material on their surface are produced by using the above-mentioned metal molds, a conventionally-known, general molding method, which is the same as the method for using respectively discrete molds, may be applied, as it is, except that the sliding member (3) is replaced so that the sliding clearance W is equal to a desired gap between the male and female molds, depending on the presence or absence of a covering material, the kind of the covering material, the kind of the synthetic resin to be used, etc.; therefore, no specific molding conditions are required for the application of the metal mold of the present invention.

For example, when a molding process is carried out by using the injection compression molding method, a sliding member, which is designed to have an optimal sliding clearance depending on factors, such as the presence or absence of a covering material and the kind of synthetic resin to be used, is attached to the mold main body, and melted synthetic resin is provided between male and female molds that are in an open state. Alternatively, upon the lamination of the covering material, after having preliminarily supplied the covering material, melted synthetic resin is supplied, and after having been mold-clamped, this is cooled off and solidified, and then by opening the metal mold, an objective synthetic resin molded product is obtained in the same manner as the conventional method.

Similarly, with respect to synthetic resins and covering materials used as materials, no specific limitation is applied; for synthetic resins, the following materials, which are generally used for compression-molding method, injection-molding method, and extrusion-molding method, are listed: common thermoplastic resins such as polypropylene, polyethylene, acrylonitrile-styrene-butadiene block copolymer, polystyrene, polyamides such as nylon, polyvinylchloride, polycarbonate, acrylic resins and styrene-butadiene block copolymer, thermoplastic elastomers such as EPM and EPDM, mixtures of these, polymer alloys using these, etc. may be used. These may have a non-foaming property or a foaming property.

These synthetic resins may contain, if necessary, fillers such as talc, glass fiber, various inorganic or organic fillers, which are generally used, and may also contain various additive agents such as antioxidants, antiultraviolet agent, various pigments, lubricating materials, static-eliminating agents and stabilizers, which are generally used.

Moreover, with respect to the covering material, various conventionally-known covering materials including various woven cloth, knitted cloth, non-woven cloth, and sheets and films of synthetic resins such as thermoplastic resin and thermoplastic elastomer, as well as paper, metal foil, net-shaped objects or foamed sheets of synthetic resins such as thermoplastic resin and thermoplastic elastomer, may be used, and these covering materials may be decorated by protruding and recessed patterns such as grain, printing, coloring, etc. Moreover, these covering materials are used not only as independent parts, but also as composite covering materials having laminated layers of two or more kinds such as thermoplastic elastomer sheets of polyvinyl chloride sheets and EPDMs having lining materials of foamed sheets such as polypropylene foamed sheets.

Upon application of the covering material, a preheating process may be carried out so as to improve the bonding property between the covering material and the synthetic resin such as thermoplastic resin, or a preparatory forming process may be applied depending on shapes of the synthetic resin molded product.

Furthermore, a supporting frame for supporting the edge of the covering material may be placed along the circumferential portion of the metal mold, if necessary.

What is claimed is:

1. A metal mold for producing a thermoplastic resin molded product in an injection compression-molding method, which comprises a pair of male and female molds, said pair of male and female molds forming a cavity into which melted thermoplastic resin is provided, said pair of male and female molds can mutually slide over an entire contact face, with an outer circumferential face of the male mold and an inner circumferential face of the female mold serving as sliding portions at a time of mold-clamping for shaping melted thermoplastic resin, characterized in that either the male mold or the female mold or both of the molds comprises a mold main body and at least one removable metal sliding member that forms a portion of the metal mold, wherein said at least one metal sliding member forms said sliding portions or a portion thereof, wherein the material of the sliding portion is still, zinc alloy or copper alloy, and wherein a sliding clearance between the male and female molds at the time of mold-clamping for shaping the melted synthetic resin is adjusted by a replacement of two or more of said metal sliding members having different sliding clearances between the outer circumferential face of the male mold or the inner circumferential face of the female mold.

2. A metal mold according to claim 1, wherein the male mold is comprised in the main mold body and wherein said male mold comprises said metal sliding member that forms a portion of the metal mold, wherein said metal sliding member forms the entire sliding portion of the male mold or a portion thereof.

3. A metal mold for producing a thermoplastic resin molded product according to claim 1, wherein said at least one metal sliding member is attached about the outer circumferential face of the male mold and/or the inner circumferential face of the female mold.

4. A method for producing a synthetic resin molded product comprising clamping a metal mold as claimed in claim 1.

5. A method for producing a synthetic resin molded product comprising use of a metal mold as claimed in claim 1.

6. A metal mold for producing a thermoplastic resin molded product in an injection compression-molding method, said metal mold comprising;

a pair of male and female molds in which at least one of said molds is clampable with respect to the other so that said male and female molds are moveable from an open to a closed state, said male mold and said female mold defining therebetween a cavity to receive thermoplastic resin for molding, said male mold having an outer circumferential face and said female mold having an inner circumferential face, said outer circumferential face and said inner circumferential face serving as respective sliding portions at a time of mold-clamping for shaping melted thermoplastic resin, said male mold and said female mold being mutually slidable over an entire contact face, at least one of said male mold and said female mold comprises at least one metallic sliding member which is steel, zinc alloy or copper alloy, and a mold main body that accepts said at least one metallic sliding member, said at least one metallic sliding member forms at least a part of one of said respective sliding portions, said at least one metallic sliding member being attached but removable from the mold main body, and wherein during mold clamping said male and female molds define at least one sliding clearance therebetween said at least one sliding clearance being selected by an installation of or replacement of said at least one said metallic sliding members so as to have at least one different sliding clearance between said outer circumferential face of the male mold or said inner circumferential face of the female mold.

7. A metal mold for producing a thermoplastic resin molded product according to claim 6, wherein said at least one metallic sliding member is selected so that said at least one sliding clearance is in the range of 0.02 to 0.1 mm.

* * * * *